United States Patent [19]

Suzuki et al.

[11] Patent Number: 4,585,465
[45] Date of Patent: Apr. 29, 1986

[54] METHOD FOR CAUSING BUBBLES IN A FLUID TO COALESCE

[75] Inventors: Ryushi Suzuki; Joji Yamaga, both of Tokyo; Kunio Matsui; Hiroaki Tsuchiya, both of Yokohama, all of Japan

[73] Assignee: Ishikawajima-Harima Jukogyo Kabushiki Kaisha, Tokyo, Japan

[21] Appl. No.: 644,657

[22] Filed: Aug. 27, 1984

Related U.S. Application Data

[63] Continuation of Ser. No. 410,826, Aug. 23, 1982, abandoned.

[30] Foreign Application Priority Data

Aug. 26, 1981 [JP] Japan ............................. 56-133768

[51] Int. Cl.⁴ ............................................. B01D 19/02
[52] U.S. Cl. ........................................ 55/52; 210/788
[58] Field of Search .................... 55/204, 205, 36, 41, 55/52; 210/788

[56] References Cited

U.S. PATENT DOCUMENTS 3,557,956  1/1971  Braun et al. .................... 210/788 X
3,996,027 12/1976  Schnell et al. .................... 55/205 X
4,097,375  6/1978  Molitor ........................... 210/788 X Primary Examiner—Thomas Wyse

[57] ABSTRACT

Disclosed is a method for causing bubbles in a fluid to coalesce into a coherent mass by use of a vessel having a cylindrical space therein wherein the fluid is caused to flow into the vessel at such a velocity that a vortex is generated to flow from one end of the space to the other while establishing a state in which the pressure on the center axis of the cylinder rises from one end toward the other, then reaches a maximal value and thereafter drops, and this coalescing of the bubbles is effected at the field near the axis of the vortex and between a position close to the inflow position and the position of the highest pressure. The method greatly facilitates deaeration.

2 Claims, 6 Drawing Figures

METHOD FOR CAUSING BUBBLES IN A FLUID TO COALESCE

This application is a continuation of application Ser. No. 410,826, filed Aug. 23, 1982, abandoned.

BACKGROUND OF THE INVENTION

The present invention relates to a method for causing bubbles in a fluid such as a liquid or a solid-laden liquid to coalesce into a coherent mass for easier deaeration.

Bubbles tend to be produced during handling of various fluids such as industrial water (e.g. boiler water), fluids (including non-flammable fluids) used in hydraulic systems, slurries for ceramic materials, slurries used as coating solutions in paper-making machines for making coated paper, coating solutions for films and tapes, lubricants, cooling liquids for quenching, chemical solutions, liquid foodstuff, and so forth. Bubbles thus produced may cause erosion due to aeration, structural weakening due to cavitation, annoying noise, degradation of the fluids, poor products non-uniformity in materials, and so forth. Hence, bubbles should be removed, but this requires that they first be separated and collected.

Various methods which make use of the buoyancy of the bubbles have been proposed for removing the bubbles in the fluids. However, these methods have not been entirely satisfactory for removing fine bubbles because the fine bubbles have so little buoyancy that they either do not float at all or require a relatively long time to rise up to the surface of the liquid, especially in fluids with a high degree of viscosity. Moreover, large equipment such as tanks must be provided for deaeration.

An object of the present invention is, therefore, to cause bubbles in a fluid to coalesce into a coherent mass.

A further object of the present invention is to facilitate deaeration by causing said bubbles to coalesce into a coherent mass.

A further object of the present invention is to provide a means for continuously and efficiently carrying out the process for causing bubbles in a fluid to coalesce into a coherent mass.

These and other objects and advantages of the present invention will become more apparent from the following description when read in connection with the accompanying drawings.

DESCRIPTION OF THE PREFERRED EMBODIMENTS

Figure 1:
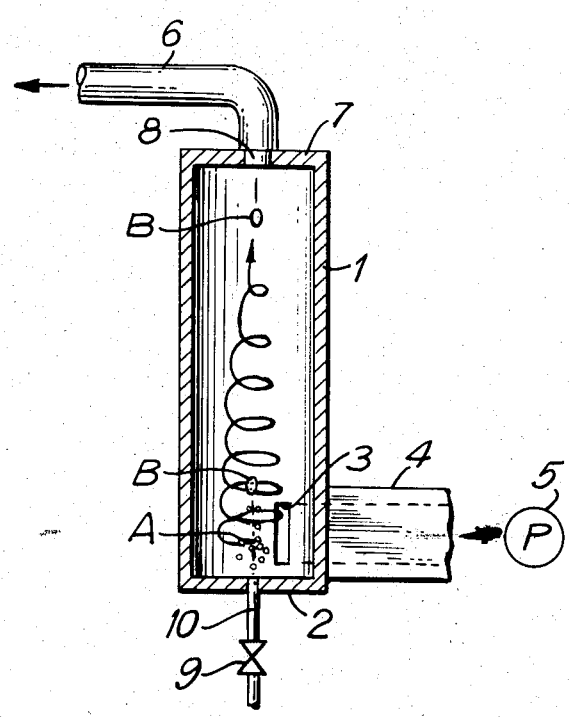
FIG. 1 is a longitudinal sectional side view showing an example of an apparatus which employs a method for causing bubbles in a fluid to coalesce into a coherent mass in accordance with the present invention.
Figure 2:
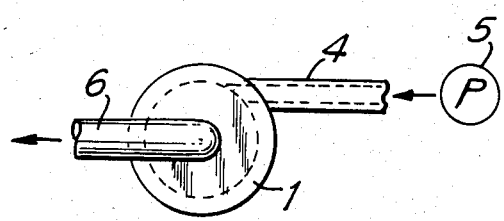
FIG. 2 is a plan view of the apparatus shown in FIG. 1.

FIGS. 1 and 2 illustrate an example of the apparatus for practising the method of the present invention. A cylinder 1, which is a vessel with an internal cylindrical space, is closed at its one end by a lid 2. An inflow port 3 is disposed on the cylinder 1 close to the lid 2 in such a manner that a fluid flows into the cylinder 1 tangentially. The other end of the cylinder 1 is closed by a lid 7. An outflow port 8 is open on the lid 7 in the axis of the cylinder 1 and communicates with a fluid outflow pipe 6.

With the above-mentioned structure, the fluid is introduced through the inflow port 3 into the cylinder 1 to form a swirling column of fluid inside the cylinder 1, with centrifugal force acting upon the fluid. The centrifugal force is proportional to the square of the tangential velocity of the swirling fluid and is inversely proportional to the radius of revolution. Accordingly, the pressure drops off sharply close to the axis of the vortex at the center of the cylinder 1.

Accordingly, the flow velocity in the tangential direction of the whirling stream becomes maximal close to the inflow port 3 and hence, the centrifugal force becomes maximal on the plane perpendicular to the axis and including the inflow port 3. In consequence, the pressure at the center of the swirling column in this field is lowest in comparison with that of the inner wall region of the cylinder 1. As the fluid flows downstream from the position of the inflow port 3, the flow velocity in the tangential direction drops and the pressure difference between the inner wall portion of the cylinder 1 and the swirling center decreases with the decreasing centrifugal force. As the fluid moves further downstream, it changes into an axial flow so that; the centrifugal effect of the flow disappears and a significant pressure difference no longer exists between the inner wall portion of the cylinder 1 and the whirl center.

Figure 3:
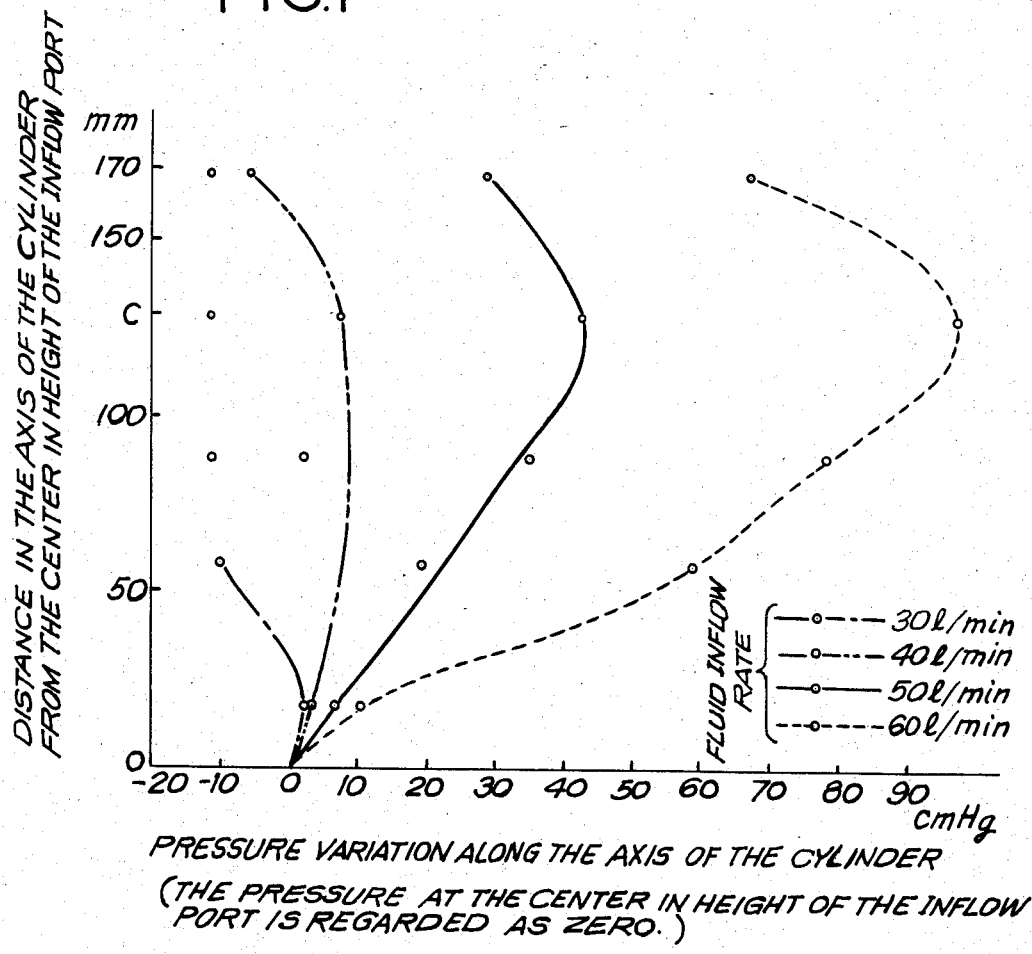
FIG. 3 is a diagram showing the result of measurement of the fluid pressure along the axis of the vortex of a swirling fluid inside the apparatus.

Next, an experiment was carried out to measure the pressure at the center of the vortex along the longitudinal direction of the cylinder 1. As a result, significant data in FIG. 3 were obtained. In this experiment a fluid (hydraulic oil) having a viscosity of 46 cSt was caused to flow into an apparatus in which the cylinder 1 had an inner diameter of 40 mm and a height of 360 mm and the inflow port 3 had a width of 10 mm and a height of 20 mm, with an inflow rate of 30 l/min and an inflow velocity of 2.5 m/sec calculated as the velocity at the inflow port 3. It was found that when the fluid is cause to flow through the inflow port 3 into the cylinder 1 in the tangential direction, the pressure at the vortex center of the swirling column is lowest in the vicinity of axis A of the cylinder 1 near the inflow port 3, gradually increases toward the downstream side of the vortex, attains a maximal value and thereafter drops, providing that the inflow rate of the fluid is great. It was also found that when the inflow fluid rate is increased, the pressure difference increases between the axis of the cylinder 1 near the inflow port 3 and a position C on the downstream side where the pressure is highest and that the distance of the position C in the direction of the axial flow from the inflow port 3 barely varies even if the inflow rate varies, providing that the inflow rate exceeds a predetermined value.

That is to say, it was found that when the fluid is caused to flow into the cylinder 1 tangentially at the field close to the lid 2 in such an inflow rate as to generate a required centrifugal force to act upon the swirling column, the pressure is lower at the axis of the cylinder near the inflow port 3 than at a given point on the downstream side.

If the bubbles are entrained in the fluid, they are acted upon by the force which tends to move them toward the axis of the cylinder 1 near the inflow port 3, where the pressure is low, said force causing them to remain there, or they are pushed back by the pressure difference between the center of the vortex inside the cylinder 1 near the inflow port 3 and the position C on the downstream side at which the pressure is the highest.

It was thus found that if the bubbles are thus concentrated toward the vortex center by the force described above, the bubbles naturally coalesce into a coherent mass.

It is important in this connection that the spiral flow in the vicinity of the inflow port 3 is sharply weakened as the fluid flows toward the downstream side, so that sharp weakening of the spiral flow will cause the above-mentioned pressure difference to increase, resulting in increased coalescence of the bubbles into a coherent mass. To this end, according to the present invention, in order to decrease the spiral force at the downstream side and direct the fluid into an axial flow as soon as possible, the cylinder 1 with the substantially cylindrical space is employed and the outflow of the fluid is effected on the axis of the cylinder 1.

The following experiment was carried out to demonstrate that the pressure at the vortex center on the downstream side is higher than that at the inflow port. In an apparatus in which the cylinder 1 had an inner diameter of 40 mm and a height of 360 mm and the inflow port 3 had a width of 10 mm and a height of 20 mm, a fluid (hydraulic oil) having a viscosity of 46 cSt was caused to flow into the cylinder at an inflow rate of 30 l/min and an inflow velocity of 2.5 m/sec calculated as the velocity at the inflow port 3. The bubbles entrained in the oil and having a particle diameter of at least about 0.1 mm coalesced and formed a coherent mass in the region around the inflow port 3.

When the bubbles have coalesced into a large coherent mass in the manner described above, the balance between the inverse force toward the inflow port 3 and the fluid force collapses so that the fluid naturally flows toward the downstream side. If the fluid outflow pipe 6 is connected to a tank or other receptacle, the coherent mass B of bubbles having great buoyancy easily rises of its own accord and is allowed to dissipate. However, as the bubble mass B bursts out into the tank or other receptable through the outflow port 8 and the fluid outflow pipe 6, it is likely to disintegrate into individual bubbles of smaller diameter due to impingement or other factors. It is therefore preferable to remove the coherent mass of bubbles at the point when they coalesce into the coherent mass.

Next, a method to accomplish this object will be explained.

Figure 4:
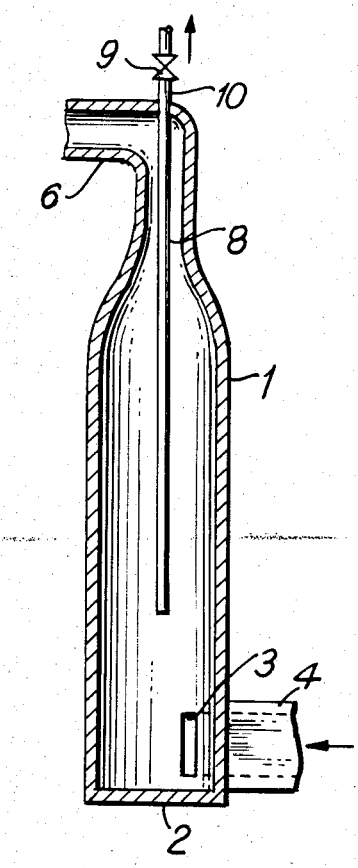
FIG. 4 is a longitudinal sectional side view showing an example of a method for removing the bubbles that have been caused to coalesce by the method of the present invention.

An air vent pipe 10 equipped with a valve 9 is connected to the center of the cylinder 1 on the lid 2 (or the vortex center), as shown in FIG. 1. When the valve 9 is opened, the bubbles that have coalesced into the coherent mass B at the center of the cylinder 1 near the inflow port 3 are natually discharged through the air vent pipe 10 because the pressure at the center axis of the cylinder 1 is generally higher than that of the atmosphere. A pump must be additionally disposed so as to discharge the bubble mass B if the accelaration applied to the fluid is so great as to substantially reduce the pressure at the center of the cylinder 1 and to restrain the mass of bubbles from moving through the air vent pipe 10. FIG. 4 illustrates an example in which the air vent pipe 10 is inserted into the cylinder 1 and opens onto the vortex from the fluid outflow side in an arragment opposite to the example described above. The air vent pipe 10 operates in exactly the same way as above. In order to effectively cause the bubbles in this instance to coalesce into a coherent mass, the air vent pipe 10 is placed so as to open onto a position where the bubbles coalesce.

Figure 5:
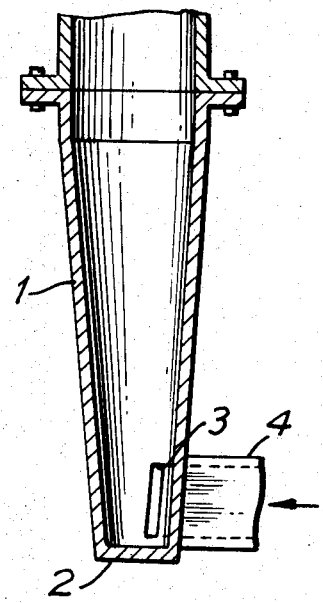
FIGS. 5 and 6 are longitudinal sectional side views, each showing a modified example of the apparatus shown in FIG. 1.
Figure 6:
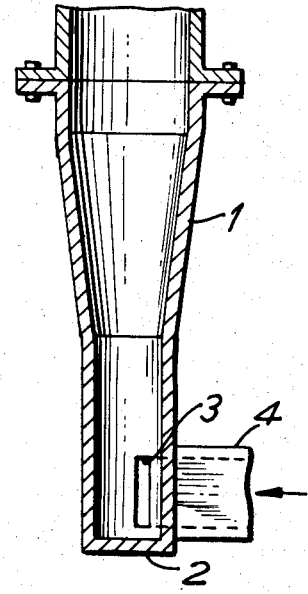

FIGS. 5 and 6 illustrate a modified example of the vessel of FIG. 1 embodying the method of the present invention. Since the capacity of the swirling column to cause the bubbles to coalesce is in invense proportion to the radius of the cylinder 1, the size of the radius of the cylinder in the field of the inflow port 3 which is of specific importance is reduced in comparison with the radius on the downstream side. It is necessary in this case, too, that the pressure on the center axis of the cylinder increases from one end toward the other, reaches a maximal value and then drops. If such an arrangement is employed, the inner diameter of the cylinder increases as the fluid moves to the other end of the cylinder so that the velocity of the swirling fluid drops drastically. Accordingly, the pressure difference can be increased or the position of the maximal pressure value that exists on the downstream side can be suitably selected. In the cylinder 1 shown, the diameter is increased in comparison with a cylinder having the same size as the cylindrical inner diameter at the inflow port 3 or a cylinder having a straight tube-like form.

The present invention is not particularly limited to the embodiments described above but can be modified in various ways without deviating from the scope and spirit thereof.

The method for causing bubbles in the fluid to coalesce in accordance with the present invention as described above provides the following effects and advantages.

(1) The fluid is caused to flow tangentially into the cylindrical space at an end thereof for formation of a vortex and is directed from the one end to an axial center on the other end of said cylindrical space for formation of an axial flow, the inflow velocity of the fluid being enough for establishment of a state in which pressure on a central axis of the cylinder rises from one end toward the other. Accordingly, bubbles in the fluid are caused to coalesce into a coherent mass at the vortex center in the field of the inflow port.

(2) As the size of the mass of bubbles increases, the buoyancy increases so that the subsequent operation of removing the mass of bubbles becomes easier.

(3) Fine bubbles in a fluid having a high viscosity that have otherwise been especially difficult to remove can be removed easily.

(4) The method can be easily accomplished using a simple apparatus.

What is claimed is:

1. A method for causing bubbles in a fluid to coalesce into a coherent mass by use of a vessel having a vertical cylindrical space therein, comprising causing the fluid to flow tangentially into said cylindrical space through an inflow port near a closed lower inflow end of said cylindrical space to form a spiral vortex flow thereof near the inflow port and directing said fluid flow in the cylindrical space axially to an upper outflow end of the cylindrical space, thereby causing transformation of said spiral vortex flow into an axial flow, the inflow velocity of said fluid being sufficient to establish a pressure differential in which pressure along the axis of the cylinder rises from said lower inflow end toward said upper outflow end, thereby causing the bubbles to resist, by virtue of said axial pressure differential, the fluid flow and move toward said inflow end and coalesce without buoyancy into a coherent mass at an area near the axis of the vortex and between an area close to the point of inflow and the point of highest pressure, and removing the bubbles from the area at which they coalesce.

2. The method according to claim 1, wherein the volume of said vessel is increased from the inflow into said space to an outflow portion thereof.

* * * * *